May 20, 1930.   J. M. VAN HOUTEN   1,759,289
METHOD OF MIXING DOUGH
Filed July 3, 1929   2 Sheets-Sheet 1
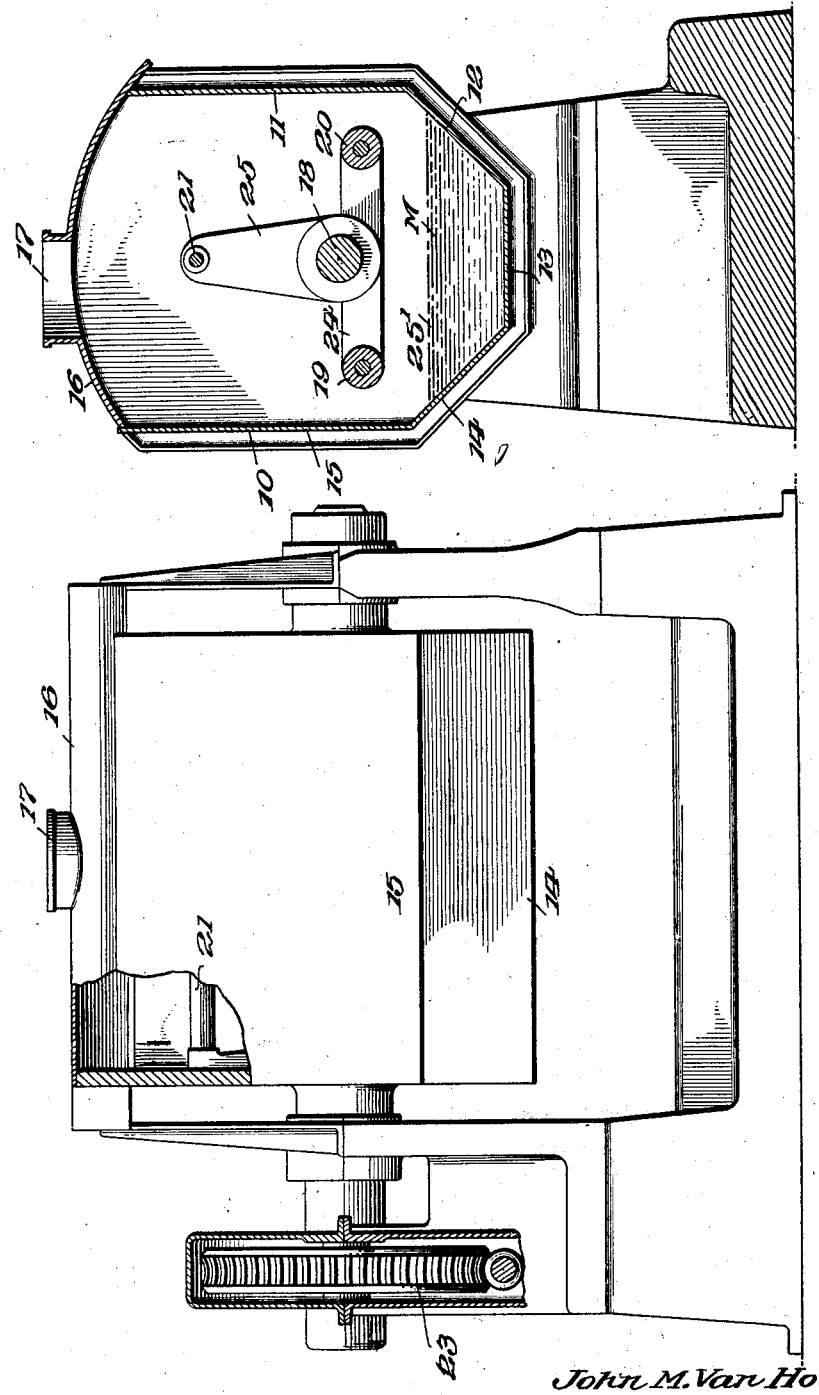
Inventor
John M. Van Houten,
By Church & Church
his Attorneys

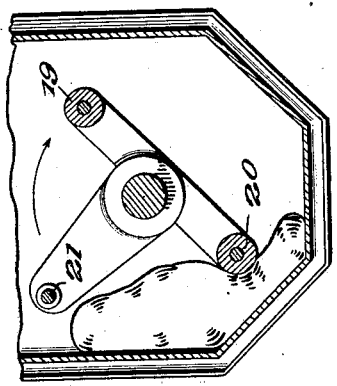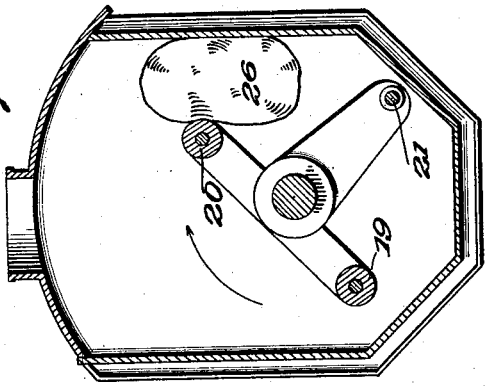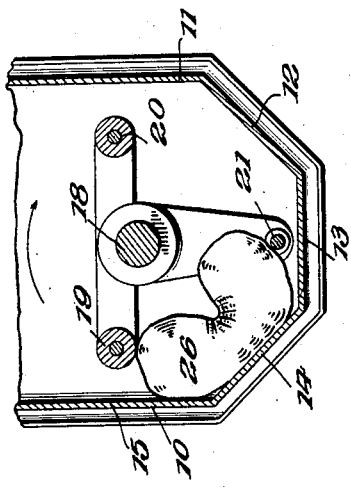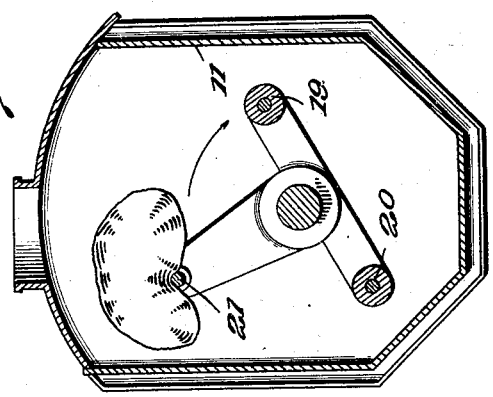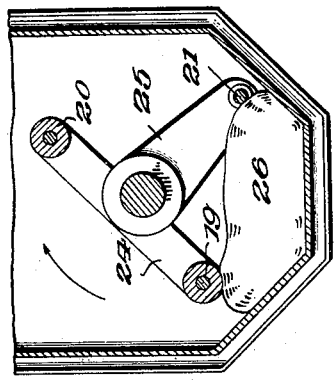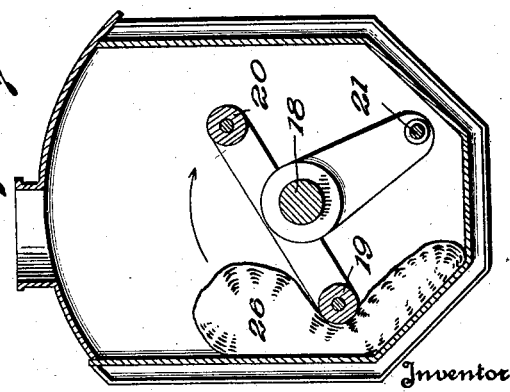

Patented May 20, 1930

1,759,289

UNITED STATES PATENT OFFICE

JOHN M. VAN HOUTEN, OF BEACON, NEW YORK, ASSIGNOR TO DUTCHESS TOOL COMPANY, OF BEACON, NEW YORK, A CORPORATION OF NEW YORK

METHOD OF MIXING DOUGH

Application filed July 3, 1929. Serial No. 375,719.

This invention relates to improvements in dough mixing processes, consisting in the novel method of manipulating the plastic mass in what is termed dough mixing apparatus.

Various mechanical methods have heretofore been proposed for mixing or kneading masses of dough and an object of the present invention is to provide a method wherein, in manipulating the mass, the same is rubbed or smeared, so to speak, along the walls of a receptacle by exerting rubbing pressure, as distinguished from a rolling pressure thereon. It is believed that this rubbing action or rubbing pressure exerted on the plastic mass of dough is quite like the action practiced by the housewife in mixing dough wherein she rubs or smears the same on a suitable working surface with the rear portion of the palms of her hands. Likewise, in the mixing of dough in the ordinary household, the housewife, after applying this rubbing pressure to one side of the dough, inverts or turns over the plastic mass and repeats the operation on the other side, this sequence of operations being continuously carried out until the mass has been properly mixed. With this in mind, as a further object the present invention contemplates a mechanical method of mixing or working the mass of dough wherein the mass is mechanically inverted or reversed so that the rubbing pressures are successively applied to different sides or surfaces of the mass, just as in the case of the housewife manually mixing a batch of dough as above outlined.

For the purpose of carrying out this improved method there is preferably employed a receptacle for the ingredients of the batch of dough to be mixed, a portion of the walls of such receptacle constituting a series of adjoining substantially flat surfaces disposed at an angle to each other on which the plastic mass of dough is rubbed by bars revoluble about an axis arranged concentrically of such surfaces. In addition to these bars for applying rubbing pressures to the mass of dough there is another bar revoluble about such shaft, but located nearer to the side flattened surfaces and adapted to intermittently pick up the mass of dough and reverse it.

While other types of apparatus for carrying out the present type of method are feasible, the accompanying drawings illustrate what is believed to be a further type of apparatus.

In said drawings:

Figure 1 is a side elevation of the machine, portions of the structure being shown broken away;

Fig. 2 is a transverse sectional view of the apparatus with the materials, in which the dough is to be made, deposited therein;

Figs. 3 to 8, both inclusive, illustrate more or less diagrammatically the various manipulations of the plastic mass of dough by the apparatus.

Preferably, the receptacle 10, in which the materials M are deposited preparatory to being mixed, is formed with a plurality of substantially flat surfaces 11, 12, 13, 14 and 15. Preferably, the surfaces 11, 15, constitute the sides of the receptacle, the surface 13 is in effect the bottom of the receptacle and the surfaces 12 and 14 connect or merge into said side and bottom surfaces. The receptacle is adapted to be closed by a cover 16 attached to the receptacle in any desired fashion, there being a small opening 17 in said closure through which the operation of the apparatus may be observed.

Extending longitudinally of the receptacle 10 and arranged concentrically with respect to all of the surfaces 11 to 15 inclusive is a shaft 18 about which bars 19, 20 are adapted to revolve, said bars being equi-distantly spaced from each of said surfaces 11 to 15. Also revoluble about said shaft 18 but located nearer said surfaces than the bars 19, 20, is a bar 21 which, in conjuction with the angularly disposed surfaces, is adapted to invert the plastic mass of dough each time it comes into contact therewith. As the working of the dough is performed entirely while the mass is in contact with walls 11 to 15 the position of shaft 18 and bars 19, 20 and 21 with respect to the cover 16 is immaterial. While the plurality of rubbing bars are shown, it is believed that the number actually shown may be either increased or decreased without departing from the spirit of the invention as defined in the appended claims.

With the apparatus as thus described the method practiced therein is as follows:

The ingredients or materials are introduced into the receptacle and occupy the lower portion thereof as indicated by the line 25' in Fig. 2. Rotary motion is then imparted by gearing 23 to shaft 18 and the bars 19, 20, 21 fixedly secured in arms 24, 25 on said shaft are revolved about said shaft and serve as mixers for the fluid and dry ingredients. After these ingredients have taken the form of a plastic mass the bars 19, 20, serve to apply rubbing pressures to such mass while the bar 21, as before mentioned intermittently inverts or reverses the mass whereby these rubbing pressures are successively imposed upon opposite or different surfaces of said mass. To more clearly disclose these operations reference is made to Figs. 3 to 8. In Fig. 3 the plastic mass of dough 26 is shown in the bottom of the receptacle and the bars 20, 19 have just finished applying rubbing pressure to said mass, and bar 21 is at that moment about to engage the mass. The next step is portrayed in Fig. 4 which shows the bar 21 picking up the mass 26 and as the bar continues to revolve about shaft 18 the mass is inverted or substantially so, so that as bar 20 and bar 19 again come in contact therewith as shown in Fig. 5 the rubbing pressures exerted thereby are applied to the reverse side of the mass. Fig. 6 shows this second series of rubbing pressures about to be completed, bar 19 having passed beyond the mass and bar 20 being positioned about midway the length of the mass. After bar 20 passes out of contact with the mass, bar 21 again comes in contact therewith and picks it up as shown in Fig. 7. In picking up the mass, the same is again inverted by bar 21 so that after it has been carried across the upper portion of the receptacle and deposited against the opposite wall 11, it is again in inverted position with respect to the position it occupied against surface 15. From this it will be seen that the mass of dough is advanced along the substantially flat surfaces from surface 11 to surface 15 primarily by the rubbing pressure exerted thereon by bars 19, 20, bar 21 inverting said mass during its advance along said surfaces and also inverting the mass while transferring it from surface 15 across the upper portion of the receptacle to surface 11.

While this mechanical mixing of the dough has been likened to the mixing of the dough by the housewife, such mixing action might also be compared with that utilized by the chemist in mixing with a spatula wherein, as is well understood, the ingredients are first rubbed on one side and then by inserting the spatula beneath the ingredients the latter are turned over or inverted and again rubbed, these several steps being continuously performed in the order stated. Furthermore, while this rubbing of the dough and its action on the dough is not thoroughly understood, nevertheless, it has been found that this method of continuously rubbing first one and the other side of the mass is one which gives excellent results in that the ingredients are completely and thoroughly mixed and the time element for accomplishing that is reduced considerably.

What I claim is:

1. The method of manipulating dough which consists in advancing a mass of dough along a working surface in paths directly angular to each other, intermittently subjecting the surface of the mass to a rubbing pressure while on said surface and periodically interrupting the advance of said mass and turning it on said surface whereby said rubbing action is successively applied to reverse surfaces of the mass.

2. The method of manipulating dough which consists in subjecting one surface of the plastic mass to a rubbing pressure while advancing said mass over a working surface in paths directly angular to each other, interrupting the advance of said mass and inverting the same, and then subjecting the surface of the opposite side of said mass to a like rubbing action.

3. The method of manipulating dough which consists in advancing a plastic mass of dough along a working surface in paths directly angular to each other by subjecting one surface of the plastic mass to successive rubbing pressures, interrupting the advance of said mass and turning the same, and then applying the rubbing pressure to the reverse surface of said mass.

4. The method of manipulating dough which consists in advancing a plastic mass of dough along a working surface in paths directly angular to each other and periodically interrupting said advance to bodily turn the mass and successively subjecting different surfaces of the mass to rubbing pressures.

5. The method of mechanically manipulating dough which consists in advancing a plastic mass of dough along a working surface in paths directly angular to each other by the application of rubbing pressures to the surface of the mass and abruptly altering the path of the advancing mass and turning said mass whereby the rubbing pressures are successively applied to different surfaces of the mass.

JOHN M. VAN HOUTEN.